(12) United States Patent
Froggatt

(10) Patent No.: US 6,900,897 B2
(45) Date of Patent: May 31, 2005

(54) APPARATUS AND METHOD FOR CORRECTING ERRORS GENERATED BY A LASER WITH NON-IDEAL TUNING CHARACTERISTICS

(75) Inventor: Mark E. Froggatt, Blacksburg, VA (US)

(73) Assignee: Luna Technologies, Inc., Blacksburg, VA (US)

(*) Notice: Subject to any disclaimer, the term of this patent is extended or adjusted under 35 U.S.C. 154(b) by 0 days.

(21) Appl. No.: 10/816,517

(22) Filed: Apr. 1, 2004

(65) Prior Publication Data

US 2004/0196467 A1 Oct. 7, 2004

Related U.S. Application Data

(60) Provisional application No. 60/459,856, filed on Apr. 2, 2003.

(51) Int. Cl.[7] .............................. G01B 9/02; G01N 21/00
(52) U.S. Cl. ........................................ 356/477; 356/73.1
(58) Field of Search ................................ 356/477, 450, 356/451, 73.1; 250/227.19, 227.27; 372/32

(56) References Cited

U.S. PATENT DOCUMENTS

| | | | | |
|---|---|---|---|---|
| 5,798,521 A | * | 8/1998 | Froggatt | 250/227.19 |
| 6,376,830 B1 | | 4/2002 | Froggatt | |
| 6,545,760 B1 | * | 4/2003 | Froggatt et al. | 356/477 |
| 6,566,648 B1 | * | 5/2003 | Froggatt | 250/227.14 |

* cited by examiner

Primary Examiner—Gregory J. Toatley, Jr.
Assistant Examiner—Patrick Connolly
(74) Attorney, Agent, or Firm—Joy L. Bryant

(57) ABSTRACT

The present invention is an apparatus and method for correcting errors generated by a laser with non-ideal tuning characteristics, the apparatus comprises a laser having non-ideal tuning characteristics. At least three interferometers are positioned in an operable relationship to the laser, wherein a sampling interferometer and at least one auxiliary interferometer correct for residual errors resulting from the laser; and wherein a measurement interferometer makes a measurement. A signal acquisition system is positioned in an operable relationship to each interferometer and a processor is positioned in an operable relationship to the signal acquisition system.

14 Claims, 4 Drawing Sheets

APPARATUS AND METHOD FOR CORRECTING ERRORS GENERATED BY A LASER WITH NON-IDEAL TUNING CHARACTERISTICS

CROSS-REFERENCE TO RELATED APPLICATIONS

This application claims the benefit of U.S. Provisional Patent Application Ser. No. 60/459,856, titled, "Apparatus and Method for Correction Errors Generated by a Laser with Non-Ideal Tuning Characteristics," filed Apr. 2, 2003, and is hereby incorporated by reference in its entirety.

FIELD OF THE INVENTION

The present invention relates to lasers having non-ideal tuning characteristics and their use in optical measurements; primarily measurements using Optical Frequency Domain Reflectometry. In particular, it relates to an apparatus and method for correcting errors generated by lasers having non-ideal tuning characteristics.

BACKGROUND OF THE INVENTION

U.S. Pat. No. 5,798,521 to Froggatt, discloses an apparatus and method for measuring strain of gratings written into an optical fiber. By measuring the complete spectral response of the Bragg grating, the strain at each point in the grating can be measured. The apparatus comprises a control system, a data acquisition (DAQ) circuit, detectors, a laser controller, and a coherent light source or tunable laser. The reference and measurement fringes are detected and sampled such that each sampled value of the reference and measurement fringes is associated with a corresponding sample number. The wavelength change of the laser, for each sample number, is determined by processing the signal from the reference optical fiber interferometer. Each determined wavelength change is matched with a corresponding sampled value of each measurement fringe. Each sampled measurement fringe of each wavelength sweep is transformed into a spatial domain waveform. The spatial domain waveforms are summed to form a summation spatial domain waveform that is used to determine location of each grating with respect to a reference reflector. A portion of each spatial domain waveform that corresponds to a particular grating is determined and transformed into a corresponding frequency spectrum representation. The strain on the grating at each wavelength of optical radiation is determined by determining the difference between the current wavelength and an earlier, zero-strain wavelength measurement. For this application, the measurement of the instantaneous wavelength of the tunable laser by the single reference interferometer is sufficiently accurate.

U.S. Pat. No. 6,376,830 to Froggatt et al. is directed toward a system and method for measuring the transfer function of a guided wave device. In particular, the N×N scalar transfer function elements for an N-port guided wave device are measured. Optical energy of a selected wavelength is generated at a source and directed along N reference optical paths having N reference path lengths. Each reference optical path terminates in one of N detectors such that N reference signals are produced at the N detectors. The reference signals are indicative of amplitude, phase and frequency of the optical energy carried along the N reference optical paths. The optical energy from the source is also directed to the N-ports of the guided wave device and then on to each of the N detectors such that N measurement optical paths are defined between the source and each of the N detectors. A portion of the optical energy is modified in terms of at least one of the amplitude and phase to produce N modified signals at each of the N detectors. At each of the N detectors, each of the N modified signals is combined with a corresponding one of the N reference signals to produce corresponding N combined signals at each of the N detectors. A total of $N^2$ measurement signals are generated by the N detectors. Each of the $N^2$ measurement signals is sampled at a wave number increment $\Delta k$ so that $N^2$ sampled signals are produced. The N×N transfer function elements are generated using the $N^2$ sampled signals. Reference and measurement path length constraints are defined such that the N combined signals at each of the N detectors are spatially separated from one another in the time domain.

Because U.S. Pat. No. 6,376,830 is directed toward optical instrumentation, the accuracy requirements on the phase measurements are quite severe. The measurement is based on the assumption that a long interferometer can be used to precisely monitor the instantaneous wavelength of a tunable laser. This assumption is valid under most regimes of operation, and to the degree-of-accuracy generally required. However, when lasers with significant tuning-speed variations are used coupled with long (>20 m) paths and a requirement of phase accuracies on the order of milli-radians, then, the assumption is no longer valid (as is the case with optical instrumentation). The breakdown of the assumption occurs when the timescale of the tuning speed variation occurs on the time scale of the delay in the interferometer. In turn, it becomes necessary to correct for errors generated by the optical source.

U.S. Pat. No. 6,566,648 to Froggatt describes an apparatus and method for measuring strain of gratings written into an optical fiber. Optical radiation is transmitted over one or more contiguous predetermined wavelength ranges into a reference optical fiber network and an optical fiber network under test to produce a plurality of reference interference fringes and measurement interference fringes, respectively. The reference and measurement fringes are detected, and the reference fringes trigger the sampling of the measurement fringes. This results in the measurement fringes being sampled at 2Π increments of the reference fringes. Each sampled measurement fringe of each wavelength sweep is transformed into a spatial domain waveform. The spatial domain waveforms are summed to form a summation spatial domain waveform that is used to determine location of each grating with respect to a reference reflector. A portion of each spatial domain waveform that corresponds to a particular grating is determined and transformed into a corresponding frequency spectrum representation. The strain on the grating at each wavelength of optical radiation is determined by determining the difference between the current wavelength and an earlier, zero-strain wavelength measurement. The apparatus and method disclosed herein fails to disclose an auxiliary interferometer that corrects for residual errors resulting from the laser.

An object of the present invention is to provide an apparatus and method for correcting for errors generated by a laser with non-ideal tuning characteristics.

Another object of the present invention is to provide an apparatus and method for correcting errors generated by a laser with non-ideal tuning characteristics that employs at least one auxiliary interferometer in parallel with a sampling interferometer and a measurement interferometer.

SUMMARY OF THE INVENTION

By the present invention, an apparatus for correcting errors generated by a laser with non-ideal tuning characteristics is presented. For the purpose of the instant application and the appended claims, non-ideal is defined as a laser having a tuning speed that is not sufficiently linear to provide phase measurements that meet the user's requirements.

The apparatus comprises a laser having non-ideal tuning characteristics. At least three interferometers are positioned in an operable relationship to the laser. A sampling interferometer and at least one auxiliary interferometer correct for residual errors resulting from the laser. A measurement interferometer makes a measurement. A signal acquisition system is positioned in an operable relationship to each interferometer. A processor is positioned in an operable relationship to the signal acquisition system.

A method for correcting errors generated by a laser with non-ideal tuning characteristics is also presented. In practicing the method, a laser having non-ideal tuning characteristics is provided. At least three interferometers are positioned in an operable relationship to the laser. A sampling interferometer and at least one auxiliary interferometer correct for residual errors resulting from the laser. A measurement interferometer makes a measurement. A signal acquisition system is positioned in an operable relationship to each interferometer and a processor is positioned in an operable relationship to the signal acquisition system.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Fiber optic interferometers are often used to measure various changes within a sample such as pressure, temperature, strain and stress. When conducting a measurement, light is launched through the optical fiber by a laser. The light passes through an optical Device Under Test (DUT) and an amplitude and phase versus time signal is generated by the interferometer. If the tuning speed of the laser is not sufficiently linear to provide phase measurements that meet the user's requirements, the laser is deemed to have non-ideal tuning characteristics.

Figure 1:
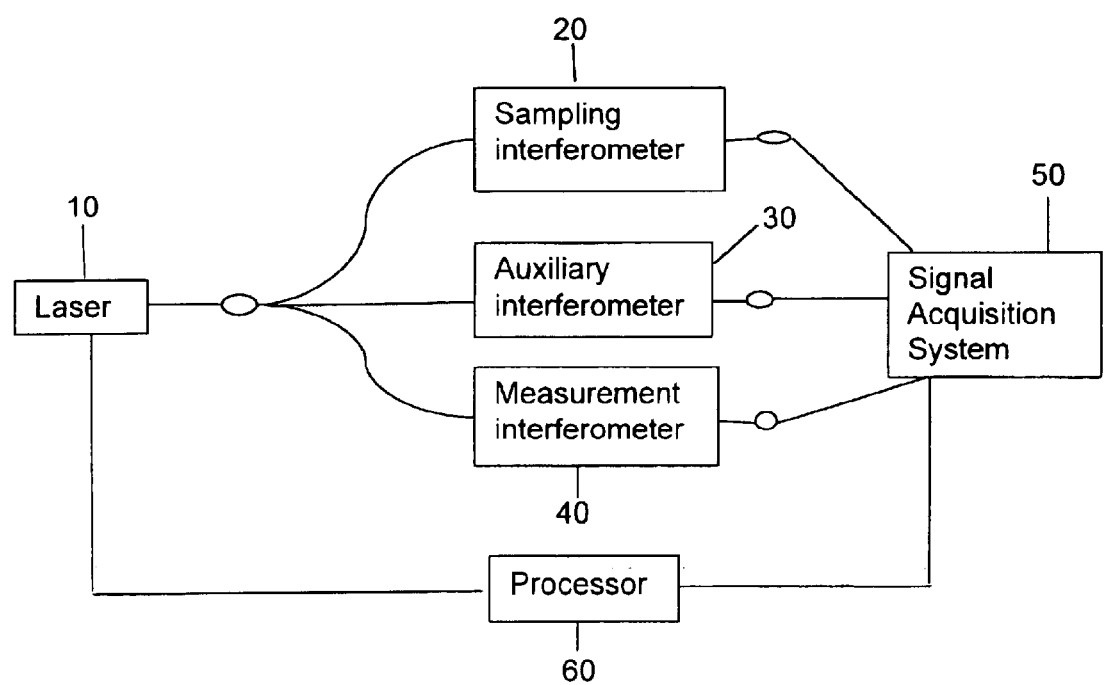
FIG. 1 is a schematic representation of an embodiment of the invention in its simplest form where three interferometers are employed.

The present invention lends itself to the correction of errors generated by the tuning variations that exist in a tunable laser. Referring now to the figures, where similar elements are numbered the same throughout, in general, the invention is an apparatus for correcting errors generated by a laser with non-ideal tuning characteristics. As shown in FIG. 1, the apparatus comprises a laser 10 having non-ideal tuning characteristics. Any laser known to those of ordinary skill in the art may be used in the present invention. Preferably, the laser is tunable and mode-hop free.

At least three interferometers 20, 30, 40 are positioned in an operable relationship to the laser. A sampling interferometer 20 and at least one auxiliary interferometer 30 correct for residual errors resulting from the laser. In practice, the sampling interferometer 20 corrects for most of the errors caused during the laser sweep. The auxiliary interferometer 30 corrects for errors not captured by the sampling interferometer 20. A measurement interferometer 40 is used to measure a sample. The figure depicts a preferred embodiment where the measurement interferometer 40 has a device under test positioned therein.

Each interferometer 20, 30, 40 generates an analog signal versus time. Signals from 30 and 40 are collected through a signal acquisition system 50 with each sample triggered by the signal from 20, such as a data acquisition device, which is positioned in an operable relationship to each interferometer. A National Instruments PCI-6115 12-bit, 10 Megasamples per second data acquisition card was used in this embodiment. A processor 60 is positioned in an operable relationship to the signal acquisition system 50. The processor 60 is also positioned in an operable relationship to the laser 10 to signal the laser when to begin the test.

Figure 2:
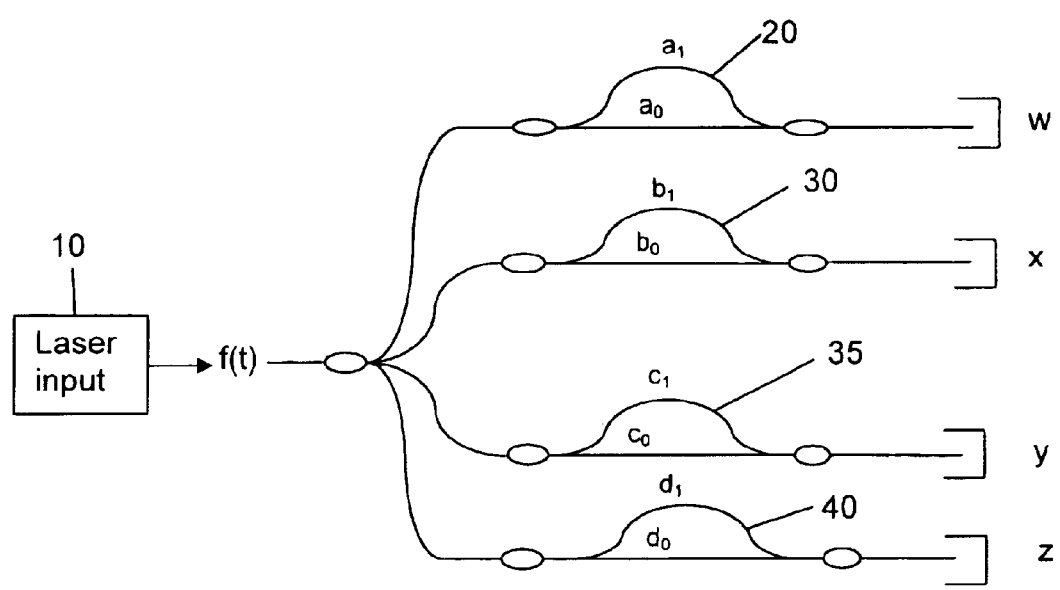
FIG. 2 is a schematic representation of the invention where multiple interferometers are used to measure difference functions as continuous variables of time.

FIG. 2 depicts an alternative arrangement of the invention wherein two auxiliary interferometers 30, 35 are employed in combination with the sampling interferometer and the measurement interferometer. When it is desirable to increase precision, additional auxiliary interferometers are added. As each additional auxiliary interferometer is added, additional residual errors resulting from the laser are corrected. Thus, the more corrections, the higher the precision of the measurement to be made.

In U.S. Pat. No. 6,376,830 a system and method for measuring the transfer function associated with single-port guided wave devices or the transfer function matrix of a multi-port guided wave device, e.g., Bragg gratings, couplers, etc. was proposed. The problem with this system and method is that it is based on the assumption that a single interferometer is adequate to correct for tuning speed variations in the laser. Moreover, such a system employed interferometers to make measurements from a device having light going through it. However, this system fails to sufficiently eliminate errors that are generated by the source of the light. Therefore, to solve this problem, begin with a presumed laser field of:

$$\psi(t) = e^{i(\omega_0 t + \alpha t^2 + a \cos \omega t)},$$

where, $a \cos \omega t$ represents the tuning speed error as time harmonic phase error. The laser frequency increases linearly with a small oscillation of amplitude, $a$, and frequency, $\omega$. The interference fringes formed by delaying a portion of this field and adding it to an undelayed version is then given by:

$$p(t) = \psi(t)\psi^*(t) + \psi(t-\tau)\psi^*(t-\tau) + 2|\psi(t)||\psi(t-\tau)| \cos(\phi_{fringe})$$

where $\tau$ is the length of the optical delay in time. The phase of the fringe term is then given by:

$$\phi_{fringe} = \omega_0 t + \alpha t^2 + a \cos \omega t - \omega_0(t-\tau) - \alpha(t-\tau)^2 - a \cos \omega(t-\tau).$$

Collecting terms.

$$\phi_{fringe}=\omega_0\tau-\alpha\tau^2+2\alpha\tau t+a(\cos\omega t-\cos\omega(t-\tau))$$

Trigonometrically expanding the cosine of a difference.

$$\phi_{fringe}=\omega_0\tau-\alpha\tau^2+2\alpha\tau t+a(\cos\omega t-\cos\omega t\cos\omega\tau-\sin\omega t\sin\omega\tau)$$

Collecting terms again $$\phi_{fringe}=\omega_0\tau-\alpha\tau^2+2\alpha\tau t+a[\cos\omega t(1-\cos\omega\tau)-\sin\omega t\sin\omega\tau]$$

By dropping the constant phase term (non time-varying) in front, the following equation is obtained:

$$\phi_{fringe}=2\alpha\tau t+a[\cos\omega t(1-\cos\omega\tau)-\sin\omega t\sin\omega\tau]$$

This fringe signal is used to sample another fringe signal from an interferometer with some length that is unequal to the sampling interferometer. The presumption follows that this is the phase of the sampled measurement interferometer and will be directly proportional to the phase of the sampling interferometer. Let the sampling interferometer have a delay, $\tau_s$, and measurement interferometer have a phase, $\tau_m$. The two phases are then given by:

$$\omega_s=2\alpha\tau_s t+a[\cos\omega t(1-\cos\omega\tau_s)-\sin\omega t\sin\omega\tau_s]$$

and $$\phi_m=2\alpha\tau_m t+a[\cos\omega t(1-\cos\omega\tau_m)-\sin\omega t\sin\omega\tau_m].$$

The corrected phase error, as caused by sampling $\phi_m$ as a function of $\phi_s$ is then given by, $$\phi_{em}=\phi_m-\frac{\tau_m}{\tau_s}\phi_s$$

where a linear relationship is assumed such that it is proportional to the delays.
Substituting in:

$$\phi_{em}=2\alpha\tau_m t+a[\cos\omega t(1-\cos\omega\tau_m)-\sin\omega t\sin\omega\tau_m]-\frac{\tau_m}{\tau_s}2\alpha\tau_s t-\frac{\tau_m}{\tau_s}a[\cos\omega t(1-\cos\omega\tau_s)-\sin\omega t\sin\omega\tau_s]$$

And collecting terms.

$$\phi_{em}=a\left[\cos\omega t(1-\cos\omega\tau_m)-\frac{\tau_m}{\tau_s}\cos\omega t(1-\cos\omega\tau_s)-\sin\omega t\sin\omega\tau_m+\frac{\tau_m}{\tau_s}\sin\omega t\sin\omega\tau_s\right]$$

The frequency of the laser tuning speed variation, $\omega$, multiplied by the interferometer delays, $\tau_s$ and $\tau_m$ is assumed to be a small but non-zero number. The sine and cosine terms are expanded to second order such that $$\phi_{em}=a\left[\cos\omega t\left(1-1+\frac{\omega^2\tau_m^2}{2}\right)-\frac{\tau_m}{\tau_s}\cos\omega t\left(1-1+\frac{\omega^2\tau_s^2}{2}\right)-\omega\tau_m\sin\omega t+\frac{\tau_m}{\tau_s}\omega\tau_s\sin\omega t\right]$$

Collecting terms $$\phi_{em}=a\left[\left(\frac{\omega^2\tau_m^2}{2}-\frac{\tau_m}{\tau_s}\frac{\omega^2\tau_s^2}{2}\right)\cos\omega t\right].$$

And finally $$\phi_{em}=\frac{a\omega^2}{2}[(\tau_m^2-\tau_m\tau_s)\cos\omega t].$$

This expression results in a phase amplitude error which takes the form of a parabola with a maximum value at $\frac{1}{2}\tau_s$ and zeros at 0 and $\tau_s$. This maximum value is:

$$\Delta\phi_{max}=\frac{a\omega^2\tau_s^2}{8}.$$

Putting this in more standard units, $$\Delta\phi_{max}=(a\omega)\frac{\omega\tau_s^2}{8}$$

$$=\left(\frac{124.7}{2\pi}\Delta r\right)\frac{2\pi(1\times10^{-9}\text{ GHz/Hz})(r)\tau_s^2}{(\Delta\lambda)8}$$

$$=\frac{124.7}{(8\times10^9)(\Delta\lambda)}\Delta r(r)\tau_s^2$$

where, r, is the average tuning rate of the laser in nm/s, $\Delta r$ is the amplitude of the deviation of the laser tuning rate in nm/s, and $\Delta\lambda$ is the period of the variation. Using the Agilent 81640A laser, the tuning rate is 40 nm/s, the period of variation is 0.03 nm $$\Delta\phi_{max}=\frac{124.7}{(8\times10^9)(0.030)}\Delta r(40)(400)^2=3.3\text{ rad}$$

Correction for the induced error can be made if another interferometer is constructed with a known single-path difference. From this interferometer, a measurement of the phase error due to tuning-speed variations can be obtained.

$$\phi_{ea}=\frac{a\omega^2}{2}[(\tau_a^2-\tau_a\tau_s)\cos\omega t]$$

The ratio of the phase errors is then given by:

$$\frac{\phi_{em}}{\phi_{ea}}=\frac{\tau_m^2-\tau_m\tau_s}{\tau_a^2-\tau_a\tau_s}.$$

Therefore, if a known interferometer is constructed and the phase error incurred when sampling this delay is measured, the phase error for all delays can be predicted. Generally, electronic delays in the detection circuit and signal conditioning can add delays and render the above equation an approximation. The ratio of the auxiliary phase to the measurement phase error can be found experimentally for any given apparatus by measuring the phase errors directly for a variety of measurement lengths. When this is done, it has been found that the variation of the ratio with length is quadratic as in the above equation.

The second order error due to laser tuning speed fluctuations can then be removed by using the following formula:

$$\phi_{m,corrected} = \phi'_m - \frac{\tau_m^2 - \tau_m\tau_s}{\tau_a^2 - \tau_a\tau_s}\phi'_a$$

where $\phi'_m$ and $\phi'_a$ are the phases of the signals measured using the sampling interferometer to trigger the sampling of these signals.

Considering the expression for the magnitude of the phase error due to tuning variation:

$$\Delta\phi_{max} = \frac{a\omega^2\tau_s^2}{8}$$

one may observe that it depends quadratically on the frequency of the tuning error. As a result, slow errors (such as those in the low audio regions—100 of Hz) do not contribute significantly. These errors can be removed by unwrapping the auxiliary phase signal, curve fitting it, and subtracting off the fitted curve.

Referring now to FIG. 2, the labeled path lengths ($a_0$, $a_1$, $b_0$, $b_1$, $c_0$, $c_1$, and $d_0$, $d_1$) are assumed to incorporate the full path from the source to the detector (not shown). If the signals w, x, y, and z are assumed to be phase signals, then the interferometers measure difference functions as continuous variables of time, such that:

$$w(t)=f(t-a_1)-f(t-a_0)$$

$$x(t)=f(t-b_1)-f(t-b_0)$$

$$y(t)=f(t-c_1)-f(t-c_0)$$

$$z(t)=f(t-d_1)-f(t-d_0)$$

It is assumed that w(t) is the trigger interferometer phase, and z(t) is the measurement interferometer phase. Therefore, with no device present it is expected that the phase of z(t) can be placed at a constant value with the proper corrections.

The initial estimate of the proper correction $q_0(t)$ is given by:

$$q_0(t) = z(t) - \frac{d_1 - d_0}{a_1 - a_0}w(t).$$

Provided that:

$$f(t)=r_0+r_1t+r_2t^2,$$

then $q_0(t)$ is a constant:

$$q_0(t)=C$$

and independent of t. This amounts to the constant tuning rate approximation. Alternatively, by allowing a tuning rate that changes, another order can be added:

$$f(t)=r_0+r_1t+r_2t^2+r_3t^3,$$

and, if all of the reference paths are equal, $a_0=b_0=c_0=d_0$, then an error is picked up on q(t) that is first order in t.

$$q_0(t)=C+3r_3(d_1-a_0)(d_1-a_1)t.$$

This error can be eliminated by recognizing that another term dependent upon t is obtained by evaluating:

$$p_0(t) = x(t) - \frac{b_1 - b_0}{a_1 - a_0}w(t),$$

a linear term in t results:

$$p_0(t)=C+3r_3(b_1-a_0)(b_1-a_1)t$$

This signal is used to correct (to first order) for tuning speed variations in the laser, providing a new phase estimator:

$$q_1(t) = z(t) - \frac{d_1 - d_0}{a_1 - a_0}w(t) - \frac{(d_1 - d_0)(d_1 - a_1)}{(b_1 - b_0)(b_1 - a_1)}\left[x(t) - \frac{b_1 - b_0}{a_1 - a_0}w(t)\right].$$

Given the balanced reference paths described above, this correction eliminates any errors due to third order phase effects in the laser (i.e. changes in the scan rate). If, however, there are fourth order terms, then another linear term is added. That linear term has a coefficient:

$$q_1(t) = C + 6r_3\frac{(d_1 - d_0)}{(b_1 - b_0) - (a_1 - a_0)}$$

$$(a_1b_0 + b_1d_0 + d_1a_0 - a_0b_1 - a_1d_0 - b_0d_1)t.$$

If the fourth order term:

$$f(t)=r_0+r_1t+r_2t^2+r_3t^3+r_4t^4$$

is present and the reference paths are balanced, then the error term is, $$q_1(t)=C-4r_4(d_1-d_0)(d_1-a_1)(d_1-b_1)t$$

and the error goes to zero when the measurement length, $d_1$, is equal to the reference length (i.e. zero length difference), when the measurement length is equal to the trigger delay, $a_1$, and when the measurement length is equal to the correcting (auxiliary) interferometer length.

The remaining interferometer signal, y(t), is used to further correct for this fourth order term:

$$q_2(t) = z(t) - \frac{(a_0 - d_1)(b_1 - d_1)(c_1 - d_1)}{(a_0 - a_1)(a_1 - b_1)(a_1 - c_1)}w(t) -$$

$$\frac{(a_0 - d_1)(a_1 - d_1)(c_1 - d_1)}{(a_0 - b_1)(b_1 - a_1)(b_1 - c_1)}x(t) -$$

$$\frac{(a_0 - d_1)(a_1 - d_1)(b_1 - d_1)}{(a_0 - c_1)(c_1 - a_1)(c_1 - d_1)}y(t)$$

This process is repeated, adding more interferometers to obtain arbitrarily good estimations.

Figure 3:
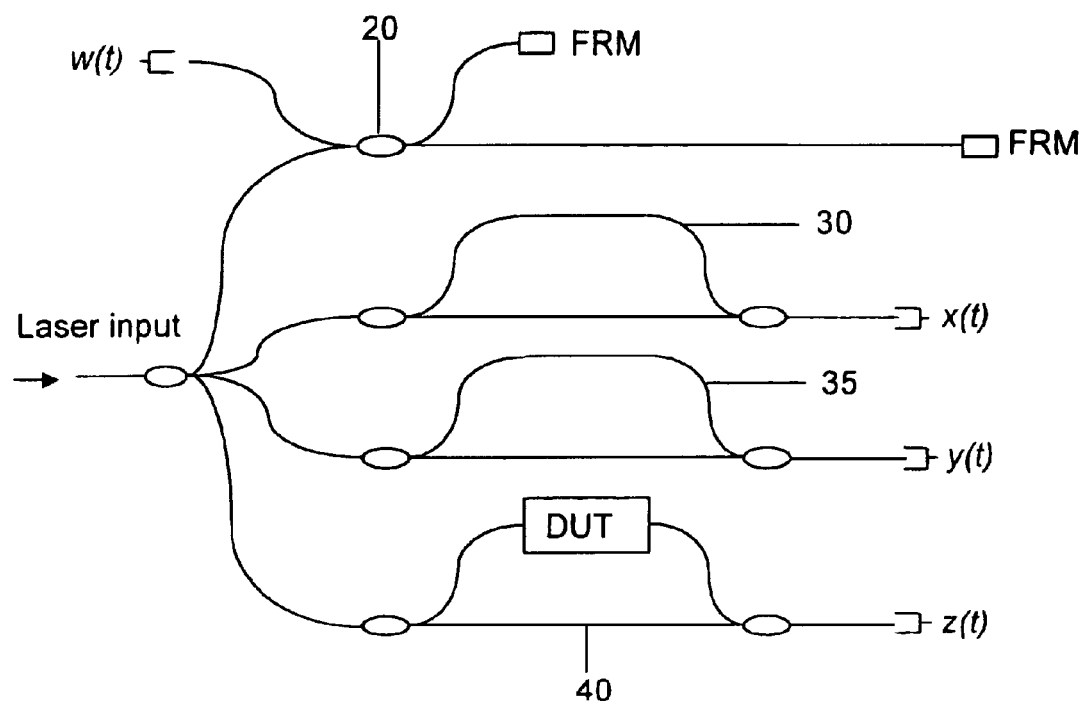
FIG. 3 is a schematic representation of the invention where one of the correcting interferometers is constructed in a Michelson interferometer configuration using Faraday Rotating Mirrors (FRM's).

FIG. 3 depicts another embodiment of the invention where the sampling interferometer 20 is constructed in a Michelson interferometer configuration using Faraday Rotator Mirrors (FRM's) 70. Faraday Rotator Mirrors 70 ensure that full interference is achieved over a wide range of tuning and all input polarization states. The first order interferometer is generally the longest, and is thus most susceptible to effects from optical polarization. The auxiliary interferometers 30, 35 coupled with the sampling interferometer 20 correct for residual errors resulting from the laser tuning speed variations. The measurement interferometer 40 is shown in a preferred embodiment where it has a device under test positioned therein.

Figure 4:
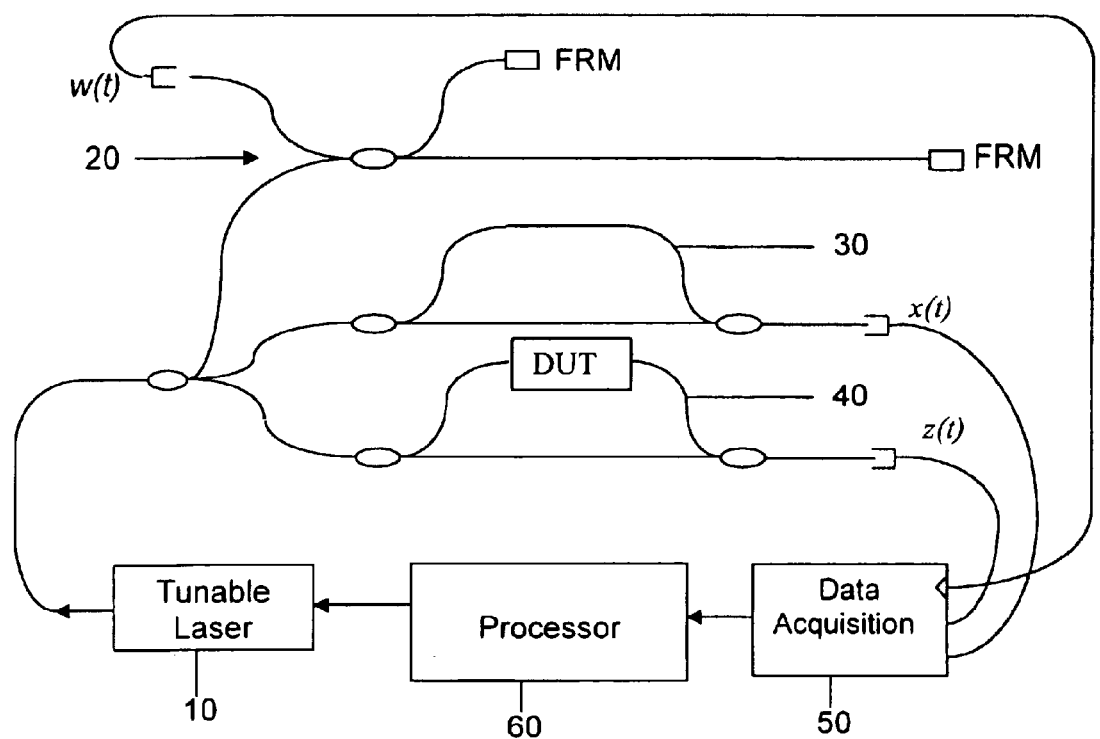
FIG. 4 is a schematic representation of the invention in a Michelson interferometer configuration as it is incorporated into a system.

FIG. 4 depicts an apparatus for correcting errors generated by a laser with non-ideal tuning characteristics where the sampling interferometer 20 is a Michelson interferometer configuration using Faraday Rotating Mirrors (FRM's) 20. An auxiliary interferometer 30 and the sampling interferometer 20 correct for residual errors resulting from the laser 10. The measurement interferometer 40 is shown in a preferred embodiment where it has a device under test (DUT) positioned therein. A signal acquisition system 50 is positioned in an operable relationship to each interferometer 20, 30, 40 such that it receives the analog phase versus time signal generated by each interferometer. A processor 60 is positioned in an operable relationship to the signal acquisition system. The processor 60 uses phase information to correct for residual errors generated by the laser. The first order correction is carried out by triggering data acquisition points as described in U.S. Pat. No. 6,376,830 to Froggatt et al. and in U.S. Pat. No. 6,566,648 to Froggatt, the specifications of each are hereby incorporated by reference in their entirety. The calculations of the phase signals from the acquired analog signals are carried out by the methods descried in U.S. Pat. No. 5,798,521 to Froggatt and is hereby incorporated by reference in its entirety.

In practicing the method of the present invention, a laser having non-ideal tuning characteristics is provided. At least three interferometers are positioned in an operable relationship to the laser. A sampling interferometer and at least one auxiliary interferometer correct for residual errors resulting from the laser, where a measurement interferometer makes a measurement. In a preferred embodiment, the measurement interferometer has a device under test positioned therein. A signal acquisition system is positioned in an operable relationship to each interferometer. A processor is positioned in an operable relationship to the signal acquisition system and uses phase information from the sampling and auxiliary interferometers to correct for measurement errors generated by the measurement interferometer. In an alternative embodiment, when it is desirable to further correct for errors, at least one more interferometer is employed.

When errors occur due to third order phase effects in the laser, such errors are corrected by the equation:

$$q_1(t) = z(t) - \frac{d_1 - d_0}{a_1 - a_0} w(t) - \frac{(d_1 - d_0)(d_1 - a_1)}{(b_1 - b_0)(b_1 - a_1)} \left[ x(t) - \frac{b_1 - b_0}{a_1 - a_0} w(t) \right]$$

where w, x and z are phase signals and where:

$w(t) = f(t-a_1) - f(t-a_0)$ $x(t) = f(t-b_1) - f(t-b_0)$ $z(t) = f(t-d_1) - f(t-d_0)$ and $a_1$, $a_0$, $b_1$, $b_0$, and $d_1$, $d_0$ are path lengths.

Fourth order terms are corrected by the equation:

$$q_2(t) = z(t) - \frac{(a_0 - d_1)(b_1 - d_1)(c_1 - d_1)}{(a_0 - a_1)(a_1 - b_1)(a_1 - c_1)} w(t) - \frac{(a_0 - d_1)(a_1 - d_1)(c_1 - d_1)}{(a_0 - b_1)(b_1 - a_1)(b_1 - c_1)} x(t) - \frac{(a_0 - d_1)(a_1 - d_1)(b_1 - d_1)}{(a_0 - c_1)(c_1 - a_1)(c_1 - d_1)} y(t)$$

where w, x, y and z are phase signals and where:

$w(t) = f(t-a_1) - f(t-a_0)$ $x(t) = f(t-b_1) - f(t-b_0)$ $y(t) = f(t-c_1) - f(t-c_0)$ $z(t) = f(t-d_1) - f(t-d_0)$ and $a_1$, $a_0$, $b_1$, $b_0$, $c_1$, $c_0$, and $d_1$, $d_0$ are path lengths.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. An apparatus for correcting errors generated by a laser with non-ideal tuning characteristics, the apparatus comprising:

a laser having non-ideal tuning characteristics;

at least three interferometers positioned in an operable relationship to the laser, wherein a sampling interferometer and at least one auxiliary interferometer correct for residual errors resulting from the laser; and wherein a measurement interferometer makes a measurement;

a signal acquisition system positioned in an operable relationship to each interferometer; and a processor positioned in an operable relationship to the signal acquisition system.

2. An apparatus for correcting errors generated by a laser with non-ideal tuning characteristics according to claim 1, wherein the measurement interferometer has a device under test positioned therein.

3. An apparatus for correcting errors generated by a laser with non-ideal tuning characteristics according to claim 1, wherein the sampling interferometer is a Michelson interferometer.

4. An apparatus for correcting errors generated by a laser with non-ideal tuning characteristics according to claim 3, wherein the Michelson interferometer comprises Faraday Rotating Mirrors.

5. An apparatus for correcting errors generated by a laser with non-ideal tuning characteristics according to claim 1, wherein errors due to third order phase effects in the laser are corrected by the equation $$q_1(t) = z(t) - \frac{d_1 - d_0}{a_1 - a_0} w(t) - \frac{(d_1 - d_0)(d_1 - a_1)}{(b_1 - b_0)(b_1 - a_1)} \left[ x(t) - \frac{b_1 - b_0}{a_1 - a_0} w(t) \right];$$

where w, x and z are phase signals and where:

$w(t) = f(t-a_1) - f(t-a_0)$ $x(t) = f(t-b_1) - f(t-b_0)$ $z(t) = f(t-d_1) - f(t-d_0)$ and $a_1$, $a_0$, $b_1$, $b_0$, and $d_1$, $d_0$ are path lengths.

6. An apparatus for measuring correcting errors generated by a laser with non-ideal tuning characteristics according to claim 1, wherein fourth order terms are corrected by the equation:

$$q_2(t) = z(t) - \frac{(a_0 - d_1)(b_1 - d_1)(c_1 - d_1)}{(a_0 - a_1)(a_1 - b_1)(a_1 - c_1)} w(t) - \frac{(a_0 - d_1)(a_1 - d_1)(c_1 - d_1)}{(a_0 - b_1)(b_1 - a_1)(b_1 - c_1)} x(t) - \frac{(a_0 - d_1)(a_1 - d_1)(b_1 - d_1)}{(a_0 - c_1)(c_1 - a_1)(c_1 - d_1)} y(t)$$

where w, x, y and z are phase signals and where:

$w(t) = f(t-a_1) - f(t-a_0)$ $x(t) = f(t-b_1) - f(t-b_0)$ $y(t) = f(t-c_1) - f(t-c_0)$ $z(t) = f(t-d_1) - f(t-d_0)$ and $a_1$, $a_0$, $b_1$, $b_0$, $c_1$, $c_0$, and $d_1$, $d_0$ are path lengths.

7. A method for correcting errors generated by a laser with non-ideal tuning characteristics, the method comprising the steps of:
   a) providing a laser having non-ideal tuning characteristics;
   b) positioning at least three interferometers in an operable relationship to the laser, wherein a sampling interferometer and at least one auxiliary interferometer correct for residual errors resulting from the laser, and wherein a measurement interferometer makes a measurement;
   c) positioning a signal acquisition system in an operable relationship to each interferometer; and
   d) positioning a processor in an operable relationship to the signal acquisition system.

8. An apparatus for correcting errors generated by a laser with non-ideal tuning characteristics according to claim 7, wherein the sampling interferometer is a Michelson interferometer.

9. An apparatus for correcting errors generated by a laser with non-ideal tuning characteristics according to claim 8, wherein the Michelson interferometer comprises Faraday Rotating Mirrors.

10. A method for correcting errors generated by a laser with non-ideal tuning characteristics according to claim 7, further comprising the steps of:
   measuring a phase difference between two different optical path lengths using the sampling interferometer; and
   measuring a phase difference between two different optical path lengths using the auxiliary interferometer wherein the optical path length difference of the auxiliary interferometer is different from the optical path length difference of the sampling interferometer.

11. An apparatus for correcting errors generated by a laser with non-ideal tuning characteristics according to claim 10, wherein the sampling interferometer is a Michelson interferometer.

12. An apparatus for correcting errors generated by a laser with non-ideal tuning characteristics according to claim 11, wherein the Michelson interferometer comprises Faraday Rotating Mirrors.

13. A method for correcting errors generated by a laser with non-ideal tuning characteristics according to claim 7, wherein errors due to third order phase effects in the laser are corrected by the equation:

$$q_1(t) = z(t) - \frac{d_1 - d_0}{a_1 - a_0} w(t) - \frac{(d_1 - d_0)(d_1 - a_1)}{(b_1 - b_0)(b_1 - a_1)} \left[ x(t) - \frac{b_1 - b_0}{a_1 - a_0} w(t) \right];$$

where w, x and z are phase signals and where:

$w(t) = f(t-a_1) - f(t-a_0)$ $x(t) = f(t-b_1) - f(t-b_0)$ $z(t) = f(t-d_1) - f(t-d_0)$ and $a_1$, $a_0$, $b_1$, $b_0$, and $d_1$, $d_0$ are path lengths.

14. A method for correcting errors generated by a laser with non-ideal tuning characteristics according to claim 7, wherein fourth order terms are corrected by the equation:

$$q_2(t) = z(t) - \frac{(a_0 - d_1)(b_1 - d_1)(c_1 - d_1)}{(a_0 - a_1)(a_1 - b_1)(a_1 - c_1)} w(t) -$$
$$\frac{(a_0 - d_1)(a_1 - d_1)(c_1 - d_1)}{(a_0 - b_1)(b_1 - a_1)(b_1 - c_1)} x(t) -$$
$$\frac{(a_0 - d_1)(a_1 - d_1)(b_1 - d_1)}{(a_0 - c_1)(c_1 - a_1)(c_1 - d_1)} y(t)$$

where w, x, y and z are phase signals and where:

$w(t) = f(t-a_1) - f(t-a_0)$ $x(t) = f(t-b_1) - f(t-b_0)$ $y(t) = f(t-c_1) - f(t-c_0)$ $z(t) = f(t-d_1) - f(t-d_0)$ and $a_1$, $a_0$, $b_1$, $b_0$, $c_1$, $c_0$, and $d_1$, $d_0$ are path lengths.

* * * * *